(12) United States Patent
Harbin

(10) Patent No.: US 6,257,227 B1
(45) Date of Patent: Jul. 10, 2001

(54) BARBECUE GRILL PROVIDING HOT WATER HEATING, STEAM AND/OR POWER

(76) Inventor: Lawrence Harbin, 2906 Maplewood Pl., Alexandria, VA (US) 22304

( * ) Notice: Subject to any disclaimer, the term of this patent is extended or adjusted under 35 U.S.C. 154(b) by 0 days.

(21) Appl. No.: 09/515,035

(22) Filed: Mar. 6, 2000

(51) Int. Cl.7 .................................................. F24C 13/00
(52) U.S. Cl. ........................ 126/5; 126/9 R; 126/25 R; 99/339
(58) Field of Search ........................... 126/5, 9 R, 25 R; 99/339, 401

(56) References Cited

U.S. PATENT DOCUMENTS

| | | | | |
|---|---|---|---|---|
| 1,083,692 | * | 1/1914 | Montgomery | 126/5 |
| 1,282,465 | * | 10/1918 | Rymal | 126/5 |
| 1,679,406 | * | 8/1928 | Courtot | 126/5 |
| 2,813,478 | * | 11/1957 | Popple | 126/5 |
| 3,809,051 | * | 5/1974 | Giroux | 126/9 R |
| 4,049,196 | * | 9/1977 | Bergami, Jr. et al. | 126/502 |
| 4,344,411 | * | 8/1982 | Dearborn | 126/5 |
| 4,455,970 | * | 6/1984 | Lyman | 126/5 |
| 4,482,077 | * | 11/1984 | Henderson | 126/384 |
| 4,584,987 | * | 4/1986 | Rotili | 126/514 |
| 4,672,944 | * | 6/1987 | Curry | 126/25 R |
| 4,919,109 | * | 4/1990 | Riley | 126/9 R |
| 5,396,878 | * | 3/1995 | Quist | 126/373 |
| 5,649,475 | * | 7/1997 | Murphy | 126/25 R |
| 5,680,810 | * | 10/1997 | Sham | 99/339 |
| 5,937,768 | * | 8/1999 | Atwood | 126/5 |
| 5,975,073 | * | 11/1999 | Kuo | 126/41 R |

* cited by examiner

Primary Examiner—Ira S. Lazarus
Assistant Examiner—David Lee

(57) ABSTRACT

An improvement useful with a portable or backyard-type barbecue grill that is used outdoors in backyards, camping, picnicking, or boating where hot water, steam, or power is not readily or conveniently available. Waste heat provides on-demand hot water and/or power. The improvement includes providing a water tank or a heat exchanger in heat transfer proximity of the grill's heat source, an opening in the tank or heat exchanger to receive water, a discharge tube to deliver hot water, and optionally a valve to control or dispense hot water. A method of producing hot water or generating power from waste heat comprises providing a tank and/or heat exchanger, filling the tank and/or heat exchanger with water or other fluid, subjecting the tank and/or heat exchanger to a source of heat in the barbecue grill, and extracting hot water or converting pressurized steam (or other fluid) to mechanical or electrical power. The improvement is particularly useful with a barbecue grill having a vertical firebox where a laterally positioned heat exchanger and/or power unit is not subjected to grease drippings, food or fuel debris, exhaust or ashes.

10 Claims, 4 Drawing Sheets

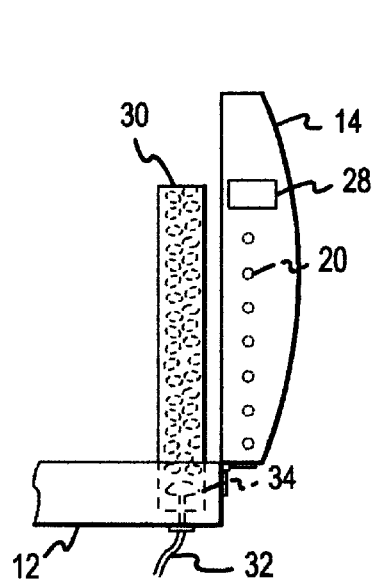
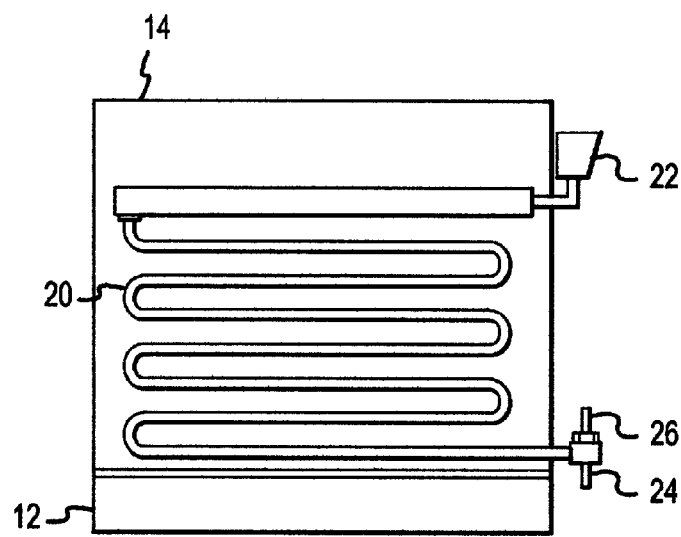
FIG.2A  FIG.2B
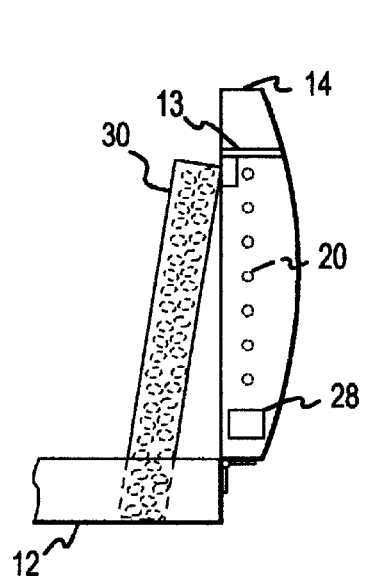
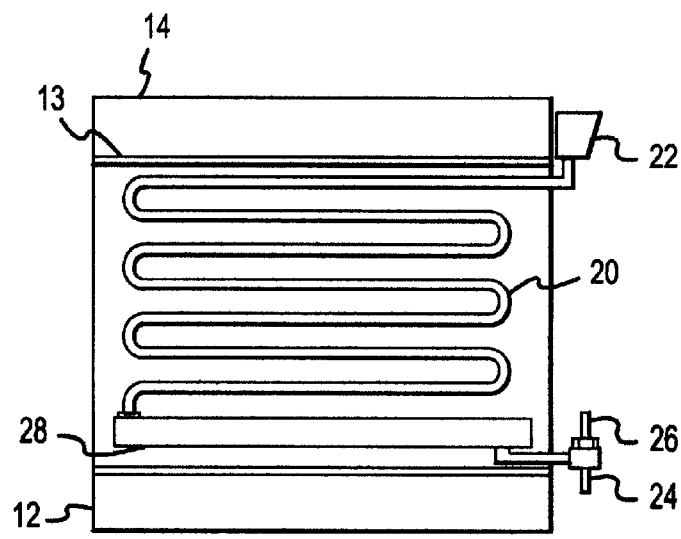
FIG.3A  FIG.3B

BARBECUE GRILL PROVIDING HOT WATER HEATING, STEAM AND/OR POWER

BACKGROUND OF THE INVENTION

This invention relates to barbecue grills, but more specifically, to methods and improvements for producing hot water, steam and/or power from the heat source of a conventional vertical or horizontal-type barbecue grill.

The improvements provided herein are particular useful for barbecue grills used in an environment where hot water, steam, or power is not readily or conveniently available. Users of portable grills for camping, picnicking, and boating will benefit greatly. For backyard grills, power is often desired and provided for rotisseries, lighting, or other needs. One advantage includes utilization of the barbecue grill's waste heat to provide on-demand hot water and/or power for purposes generally used in a home, and with quiet operation.

SUMMARY OF THE INVENTION

In accordance with the present invention, the improvement comprises a water tank and/or a heat exchanger located in heat transfer proximity of a source of heat of a barbecue grill, an opening in the tank and/or heat exchanger for receiving water, a discharge port for delivering heated water, and optionally a valve for controlling the flow of water from said tank.

In accordance with another feature of the present invention, a method of heating water or generating power from waste heat of a barbecue grill comprises providing a source of heat in a barbecue grill, providing a tank and/or a heat exchanger in the barbecue grill, filling the tank and/or heat exchanger with water (or other fluid), subjecting the tank and/or heat exchanger to a source of heat, and extracting hot water or converting pressurized steam (or other fluid) to mechanical or electrical power. Power generation may operate in an open or closed cycle.

These and other aspects and features of the invention will become apparent upon review of the following disclosure taken in conjunction with the accompanying drawings.

BRIEF DESCRIPTION OF THE DRAWINGS

FIGS. 2A and 2B are side and front views, respectively, of a gas-fired, vertical hearth barbecue grill incorporating an improvement of the present invention.

FIGS. 3A and 3B are side and front views, respectively, of a charcoal-burning, vertical hearth barbecue grill having an inclined firebox incorporating an improvement of the present invention.

DESCRIPTION OF ILLUSTRATIVE EMBODIMENTS

The improvement is particularly useful with a barbecue grill having a vertical firebox where a laterally positioned heat exchanger and/or power unit is not subjected to grease drippings, food or fuel debris, exhaust or ashes.

Figure 1:
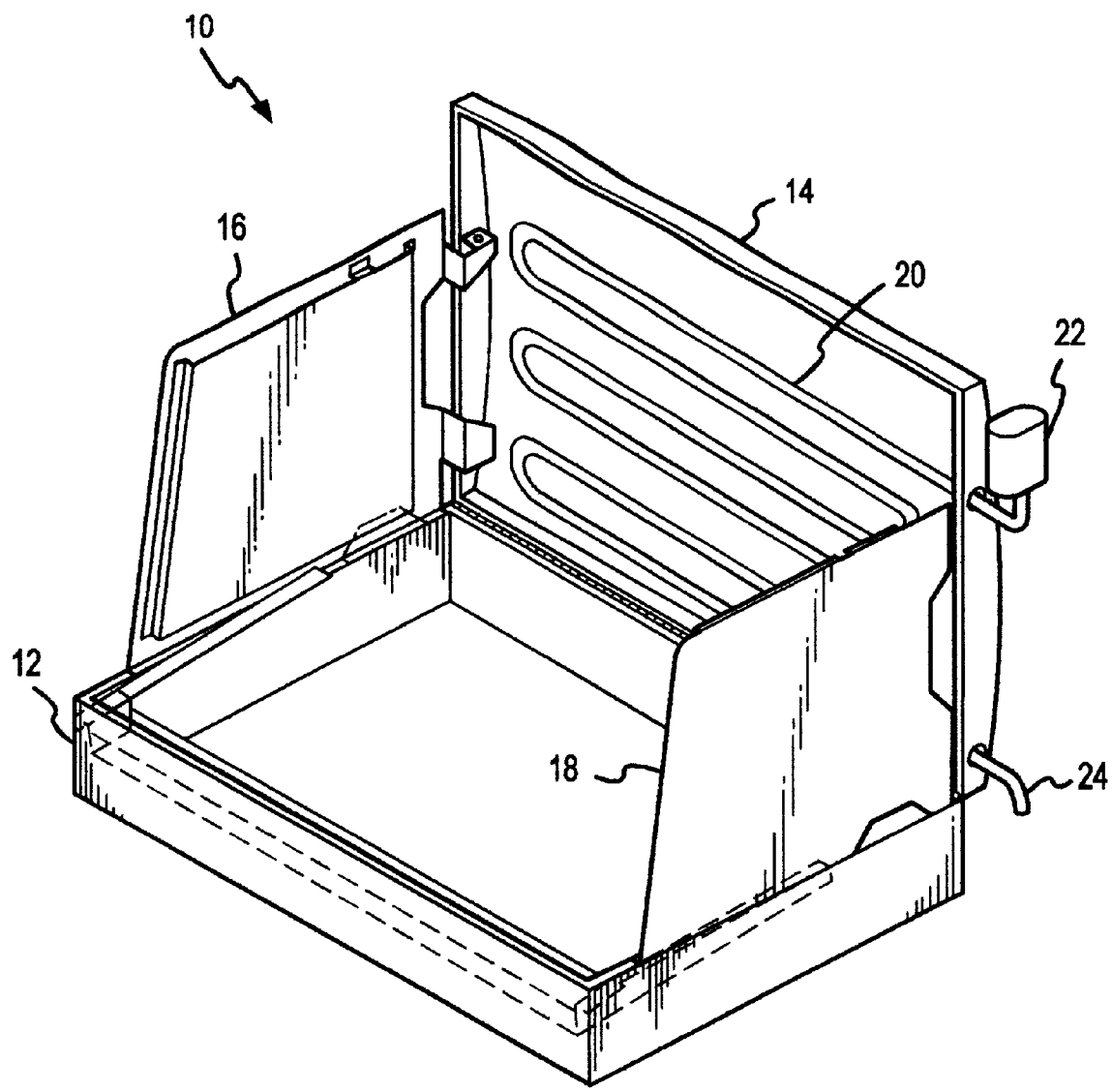
FIG. 1 is a perspective view of a portable, vertical hearth barbecue grill incorporating an improvement of the present invention.

FIG. 1 illustrates a portable, vertical hearth barbecue grill including an improvement of the present the invention, it be understood that grills having conventional horizontal-type briquette or propane heating may also incorporate the improvement hereof. Barbecue grill 10 of FIG. 1 includes a base housing 12, a pivotally attached upper housing in the form of a dome or lid 14, and a pair of side panels 16 and 18 that are pivotally attached to dome 14. Grill 10 may also include legs (not shown). A vertical firebox, which provides a source of heat from burning charcoal or propane fired briquettes, is not shown here for the sake of convenient illustration. An inventive improvement includes a heat exchanger shown in the form of a coil or tube 20 located at a position behind the firebox and inside the dome 14. Preferably, the coil 20 is comprised metal tubing having a relatively high heat transfer coefficient and heat absorption characteristics, such as copper, anodized aluminum, or other metals. Coil 20 may also include conventional fins (not shown), baffles (not shown), or cross member bars (not shown) that assist in heat exchanging. The heat exchanger may also simply comprise a metal plate 19 (FIG. 5) or other metallic structure having water channels, water passages, or other structure that permits transfer of heat to the water.

A funneling device, such as a cup 22, connects to an input of coil 20. This helps channel fresh water to fill the coil. An discharge end 24 of tube 20 provides heated water discharged from the coil 20 after it passes in heat transfer proximity of a heated firebox. When the firebox is fully fired, e.g., about eight pounds of charcoal fully burning, twenty feet of copper tubing 3/16"" inside diameter coil spaced about two inches from the rear of the firebox heats 60° F. supply water to about 120° F. at a flow rate of about ten ounces per minute. Heating can be improved by positioning the coil closer to the fire box, decreasing the flow rate, providing additional coil length, improving the heat absorption or transfer efficiency of the coil (e.g., adding fins, baffles, cross member rods, etc.), or a combination of these. Alternatively, grill 10 may include a holding tank positioned in heat transfer proximity of the firebox in order to heat a reservoir of water for subsequent consumption, rather than heating during flow through a heat exchanger.

FIGS. 2A and 2B show side and front views of a portable, vertical hearth barbecue grill having a vertical firebox that heats water both in a tank 28 and as water flows through coil 20. In FIG. 2A, gas-fired briquettes in firebox 30 are heated by a gas source 32, e.g., propane or natural gas, and gas burner 34 located at a lower portion of firebox 30. Water tank 28 located near an upper portion of firebox 30 is filled with supply water via funnel device 22 and, during firing of the briquettes, becomes heated by radiant and convection heat from firebox 30. A heat exchanger coil 20, although not necessary, communicates with tank 28 to further heat gravity-fed supply water flowing through coil 20 downwardly in lateral proximity of firebox 30 to a discharge port 24. A manually operated check valve or tap 26 controls the flow of water.

FIGS. 3A and 3B show side and front views of a charcoal-burning, vertical hearth barbecue grill having an inclined firebox 30 filled with briquettes. In the illustrated embodiment, firebox 30 has a charcoal capacity of about six to eight pounds. Inclination reduces the likelihood of ashes falling onto food cooking grids or surfaces (not shown). A shelf 13 inside dome 14, among other things, helps provide a heated compartment or chamber behind the heated firebox 30 where heat exchanger coil 20 is located. The heated chamber further confines heat energy in and about the heating coil 20, which may additionally include fins or absorption rods to improve heat absorption and transfer capacity. As previously described, a funneling device or cup 22 assists in filling coil 20 with water, which becomes heated as it is gravity fed to tank 28. Tank 28 is laterally disposed near a lower portion of firebox 30 and holds a heated supply of water until discharged through discharge tube 24 by manually operated check valve 26.

As with FIGS. 2A and 2B, the tank in FIGS. 3A and 3B may be located at any position in or out of heat transfer proximity of the firebox. As indicated above, water may be heated using the tank 28 without the heat exchanger coil 20 or by the heat exchanger coil without the tank 28. The coil and the tank may be used in combination to heat water and/or store hot water once heated.

Figure 4:
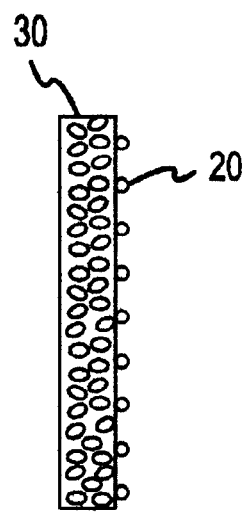
FIG. 4 shows a heat exchanger in the form of a heating coil directly fixed to a firebox in accordance with another aspect of the present invention.

FIG. 4 shows an embodiment having a heat exchanger coil 20 attached directly to the firebox 30. In actual implementation, copper or copper-plated tubing may be brazed directly to the surface of the firebox, which is preferably comprised of stainless steel. Although not shown, the heat exchanger coil or holding tank may be integrally formed with a surface of firebox 30.

Figure 5:
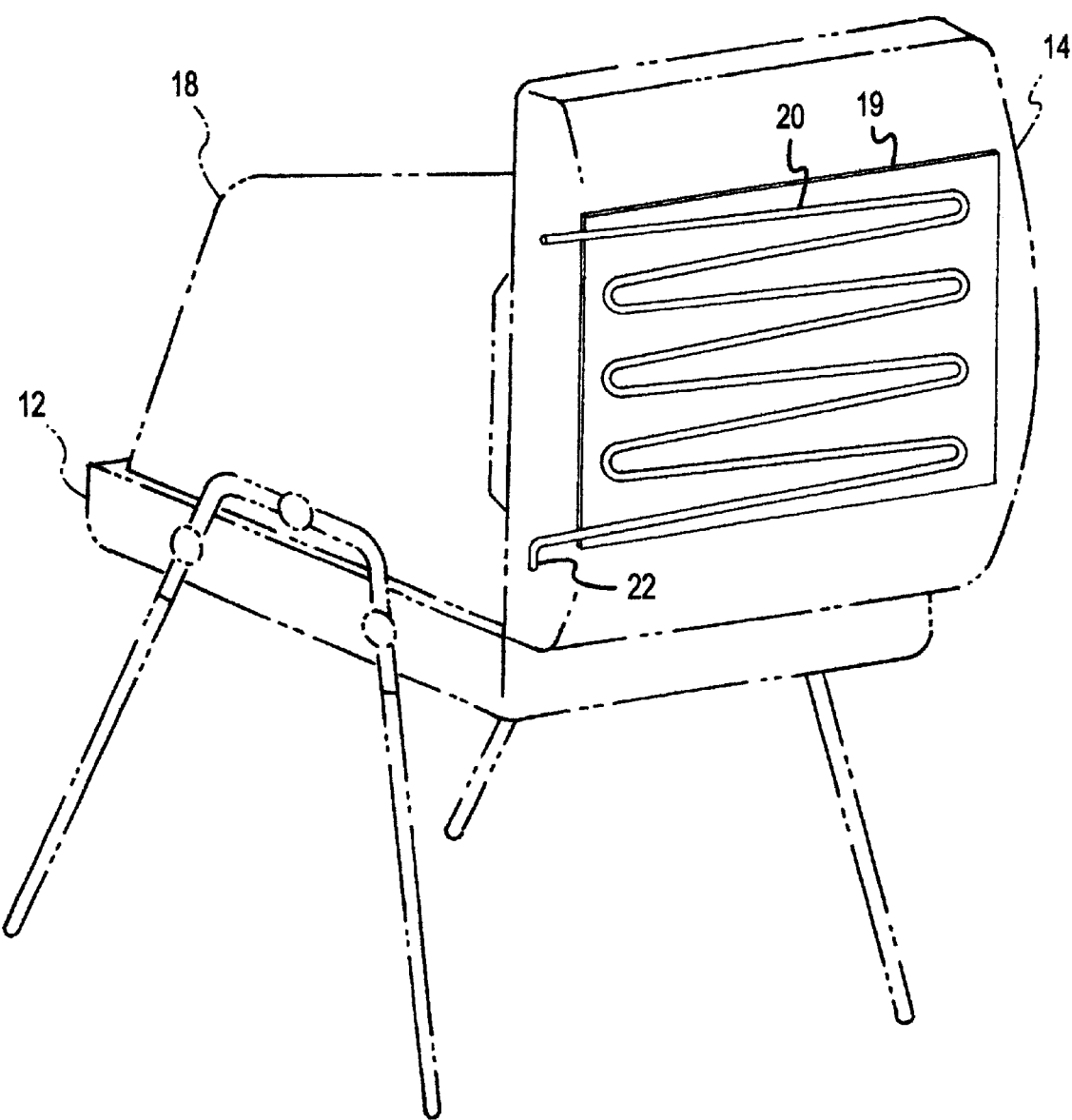
FIG. 5 is a rear perspective view of a vertical hearth barbecue grill that includes a hot water supply according to an aspect of the invention.

FIG. 5 is a rear perspective view of a vertical hearth barbecue grill that includes a heat exchanger comprising plate 19 and tubular coil 20 disposed in an area between dome 14 and a vertical firebox (not shown here).

Figure 6:
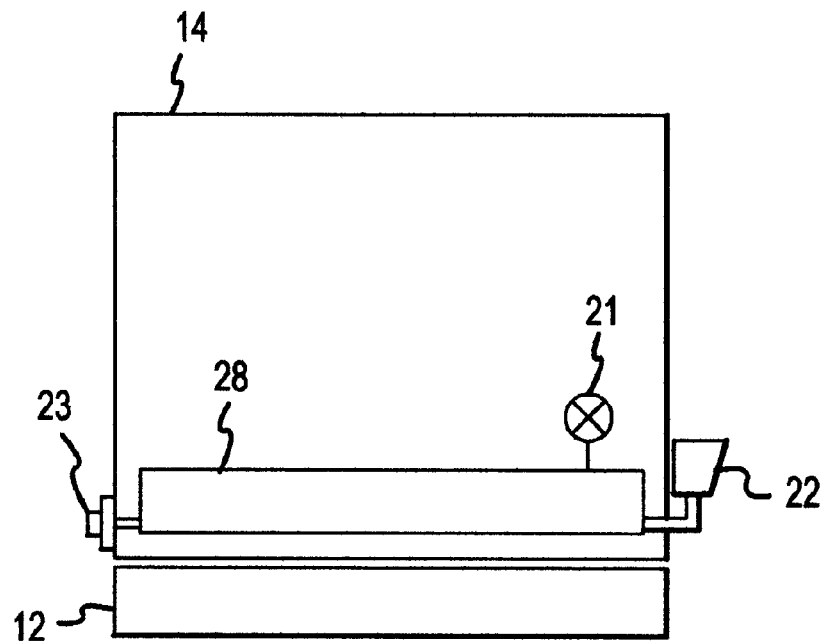
FIG. 6 illustrates that a hot water or steam power generating unit, powered by heat extracted from a source of heat of a vertical or horizontal barbecue grill, may be provided according to principles of the present invention.

FIG. 6 illustrates use of waste heat from burning fuel to produce steam for driving a rotisserie, producing mechanical power, producing electrical power in a conventional manner known in the art, or simply supplying steam that is directed onto the food cooking region. In this embodiment, tank 28 (which may be located at any location in the barbecue grill in heat exchange proximity to the firebox) is pressurized by pressure valve 21 thereby to produce a supply of pressurized steam at a discharge port 23. This steam may be directed onto foodstuffs while cooking (e.g., steamed vegetables, meats, poultry, seafood, etc.). Also, in a conventional way, the pressurize steam or other fluid may be used to rotatably (or reciprocally) drive a conventional mechanical electric or thermoelectric generator to produce lighting or other electrical needs, or to rotatably drive a rotisserie. The power unit may operate in an open or closed cycle, use a variety of circulating fluids or vapors, and/or include condensers/evaporators as well known in the art. Such devices may be provided with both vertical or conventional horizontal barbecue grills.

The invention also provides a method of producing hot water from a barbecue grill including providing a source of heat in the barbecue grill, providing a heat exchanger (with or without fins or heat absorption elements) in proximity to the source of heat, passing water through or about a heat exchanger, and discharging heated water from the heat exchanger. Another embodiment of the method includes providing a tank or reservoir in a barbecue grill, filling the tank with water, subjecting the tank to a source of heat, and extracting hot water from the tank with or without a check valve. The improvement further includes producing steam for cooking foods in a barbecue grill, comprising the steps of providing a water tank in a barbecue grill (vertical or horizontal), filling the tank with water, subjecting the tank to a source of heat, and directing steam generated by said tank upon a food cooking region of the barbecue grill. In addition, the improvement includes a method of producing power comprising providing a source of heat in said barbecue grill, providing a pressure tank in said barbecue grill, filling said tank with water or other fluid, pressurizing said tank by subjecting said tank to said source of heat, and converting steam or gas vapor produced by the tank to mechanical or electrical power.

According to the above teaching, various modifications of the inventive improvements may be employed with various type of barbecue grills of both horizontal and vertical hearth types. A water tank disposed in heat transfer proximity may be used alone or in combination with a heat exchanger through which, over which, or about which water flows. The heat exchanger may be use alone to provide a continuous hot water feed. The tank, heat exchanger, or the combination thereof may power a thermoelectric generator or mechanical drive to perform a variety of tasks including driving a rotisserie, lighting, or other power needs. Therefore, it is the intent to embrace each such modification or adaptation as may come to those skilled in the art.

I claim:

1. A vertical hearth barbecue grill comprising a generally rectangular base housing, a lid positionable upright near a rear of said base housing, a vertical hearth that is removably positionable upright in front of said lid for providing a source of heat to a cooking area located in front of the vertical hearth, a heat exchanger being supported within an area between the lid and the vertical hearth in heat transfer proximity of said source of heat, an opening in said heat exchanger for receiving a supply of water, and an output in communication with said heat exchanger for delivering hot water heated by said source of heat.

2. The vertical hearth barbecue grill as recited in claim 1, further comprising an output valve for controlling flowing water delivered by said output.

3. The vertical hearth barbecue grill as recited in claim 1, further comprising a funnel device attached to said opening for channeling water to said heat exchanger.

4. The vertical hearth barbecue grill as recited in claim 1, wherein said heat exchanger comprises a material having a relatively high heat transfer characteristic.

5. The vertical hearth barbecue grill as recited in claim 4, wherein said material comprises copper.

6. A vertical hearth barbecue grill comprising a base, a dome positionable upright near a rear of said base, and a firebox positionable generally upright in front of the dome that provides a source of heat for a cooking area in front of the firebox, a heat exchanger coil located between said dome and said firebox, an opening in said heat exchanger coil for receiving water, and a discharge portion of said heat exchanger coil for delivering water heated by said source of heat as water flows through said heat exchanger coil.

7. The vertical hearth barbecue grill as recited in claim 6, further comprising a funnel for channeling water to said heat exchanger coil.

8. A vertical hearth barbecue grill comprising a base, a dome that is positionable upright near a rear of said base, a firebox that is positionable generally upright in front of said dome and that provides a source of heat to a cooking area in front of said firebox, a tank located between the dome and a rear of the firebox, an input to said tank for receiving a fluid, a pressure valve that pressurizes said tank when heated by said source of heat, and a discharge port for delivering pressurized gas from said tank.

9. A vertical hearth barbecue grill comprising a base housing, a lid positionable upright near a rear of said base housing, aremovable firebox that is positionable generally upright near a rear of the base housing in front of the lid and that provides a source of heat to a cooking area generally disposed in front of said firebox, a water tank being supported within an area between the lid and the firebox located in heat transfer proximity of said source of heat, an opening in said tank for receiving water, a discharge port for delivering water heated by said source of heat, and a valve for controlling a flow of water from said tank.

10. A method of producing hot water in a vertical hearth barbecue grill, comprising:

provi ding a base and a lid where the lid is positionable generally upright near a rear portion of the base, providing a source of heat in front of the lid in the form of a generally upright firebox, providing a heat exchanger in heat transfer proximity of said source of heat between said lid and said generally upright firebox, passing water through said heat exchanger, and discharging heated water from said heat exchanger.

* * * * *